(No Model.) 4 Sheets—Sheet 1.

E. J. BAGNALL.
MOTOR MOUNTING AND DRIVING MECHANISM.

No. 567,560. Patented Sept. 8, 1896.

Witnesses:
F. R. Cornwall
Hugh H. Wagner

Inventor
Ernest J. Bagnall
by Paul Bakewell
his atty.

(No Model.) 4 Sheets—Sheet 2.
E. J. BAGNALL.
MOTOR MOUNTING AND DRIVING MECHANISM.
No. 567,560. Patented Sept. 8, 1896.
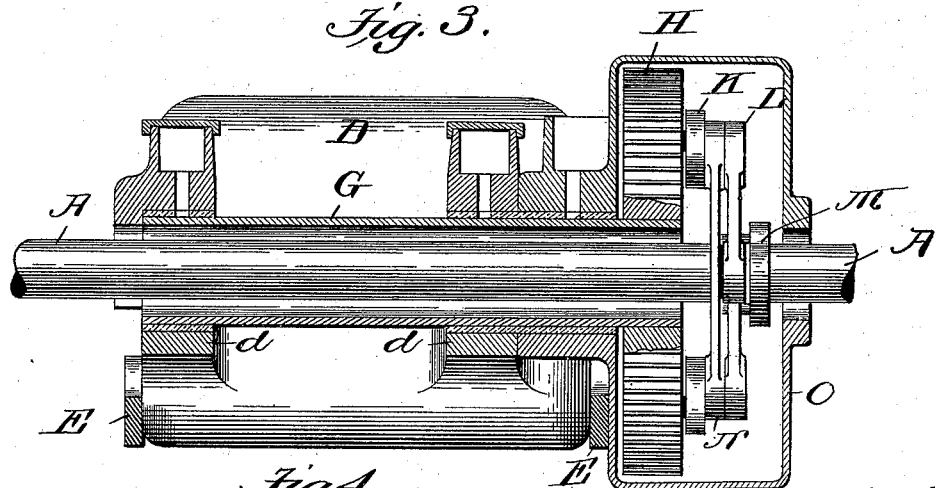
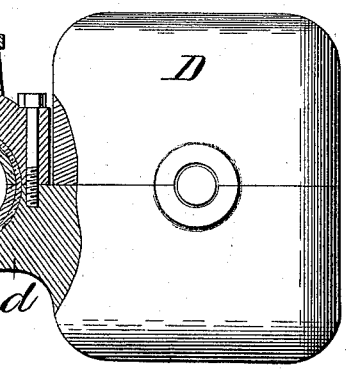
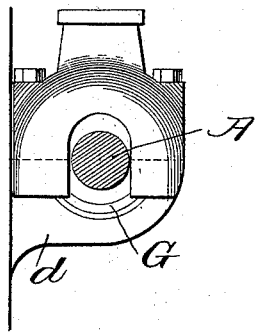
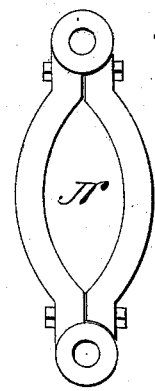
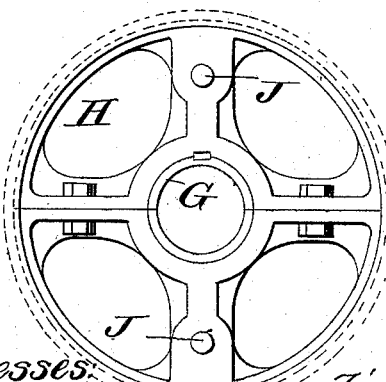
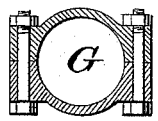
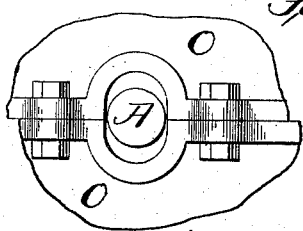
Witnesses: F. R. Cornwall, Hugh H. Wagner
Inventor: Ernest J. Bagnall, by Paul Bakewell, his atty.

(No Model.) 4 Sheets—Sheet 3.
E. J. BAGNALL.
MOTOR MOUNTING AND DRIVING MECHANISM.
No. 567,560. Patented Sept. 8, 1896.
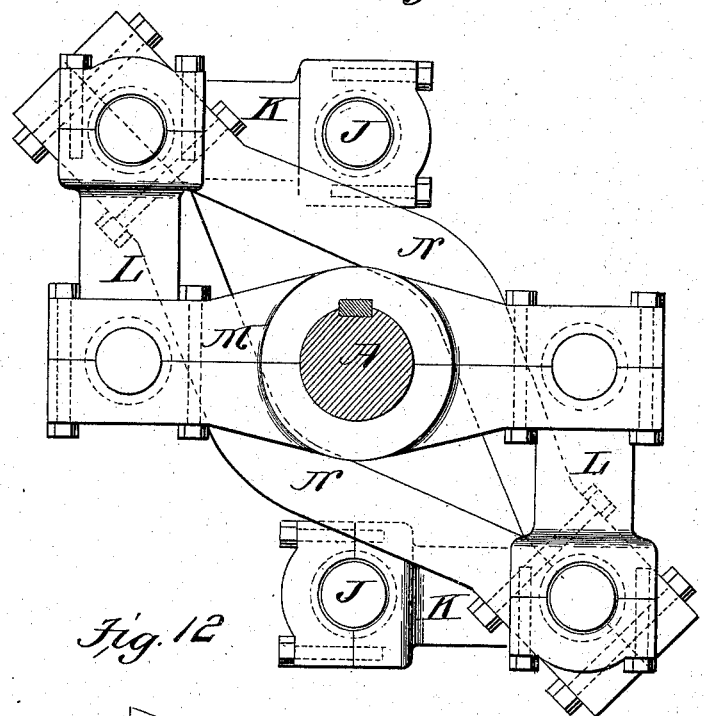
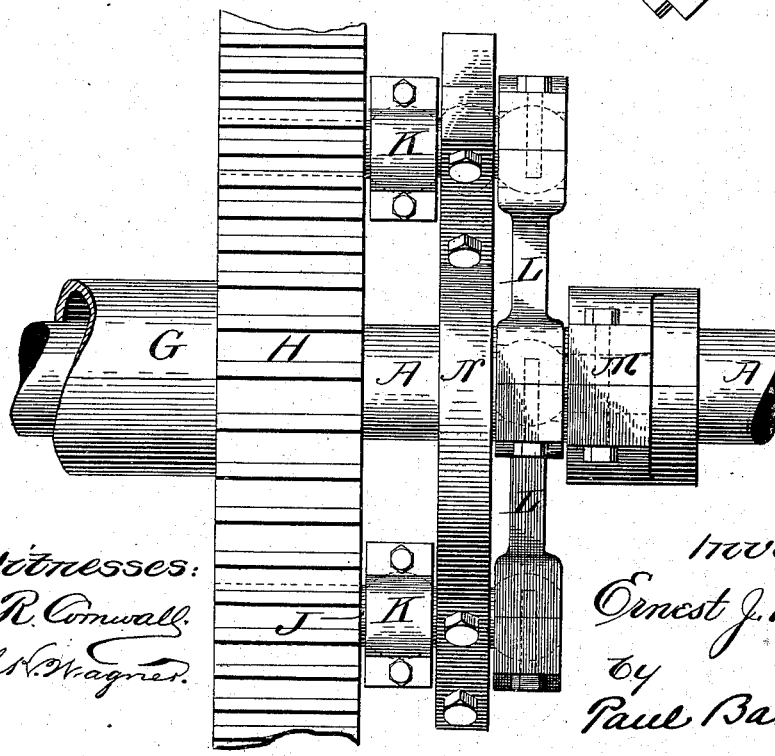
Witnesses:
J. R. Cornwall
Hugh V. Wagner
Inventor:
Ernest J. Bagnall,
by
Paul Bakewell,
his atty.

(No Model.) 4 Sheets—Sheet 4.
E. J. BAGNALL.
MOTOR MOUNTING AND DRIVING MECHANISM.
No. 567,560. Patented Sept. 8, 1896.

Witnesses:
F. R. Cornwall
Hugh K. Wagner

Inventor
Ernest J. Bagnall
by Paul Bakewell
his atty.

UNITED STATES PATENT OFFICE.

ERNEST J. BAGNALL, OF CLEVELAND, OHIO, ASSIGNOR TO THE ADAMS-BAGNALL ELECTRIC COMPANY, OF SAME PLACE.

MOTOR MOUNTING AND DRIVING MECHANISM.

SPECIFICATION forming part of Letters Patent No. 567,560, dated September 8, 1896.

Application filed September 4, 1895. Serial No. 561,391. (No model.)

*To all whom it may concern:*

Be it known that I, ERNEST J. BAGNALL, a citizen of the United States, residing at the city of Cleveland, county of Cuyahoga, State of Ohio, have invented a new and useful Improvement in Motor Mountings and Driving Mechanism, of which the following is a full, clear, and exact description, reference being had to the accompanying drawings, forming part of this specification, wherein—

Figure 1:
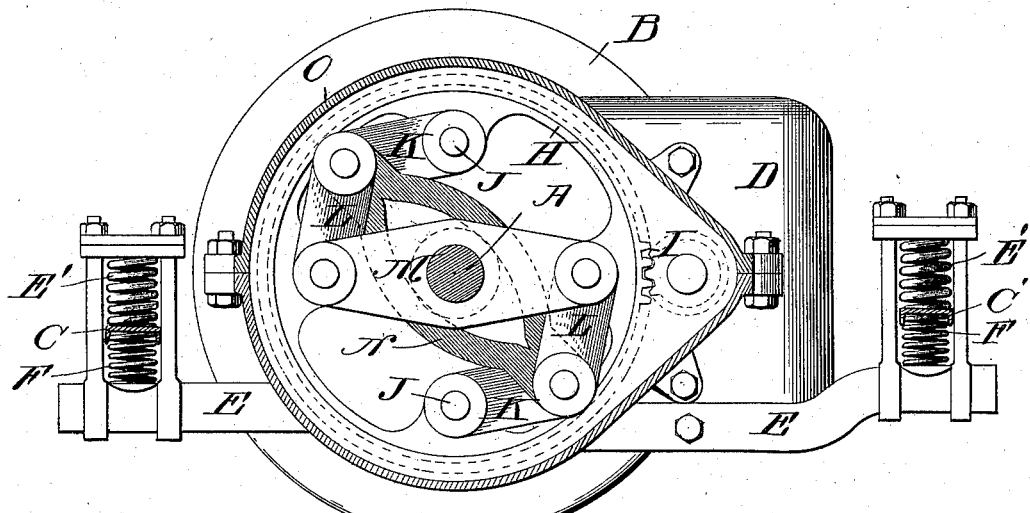
Figure 2:
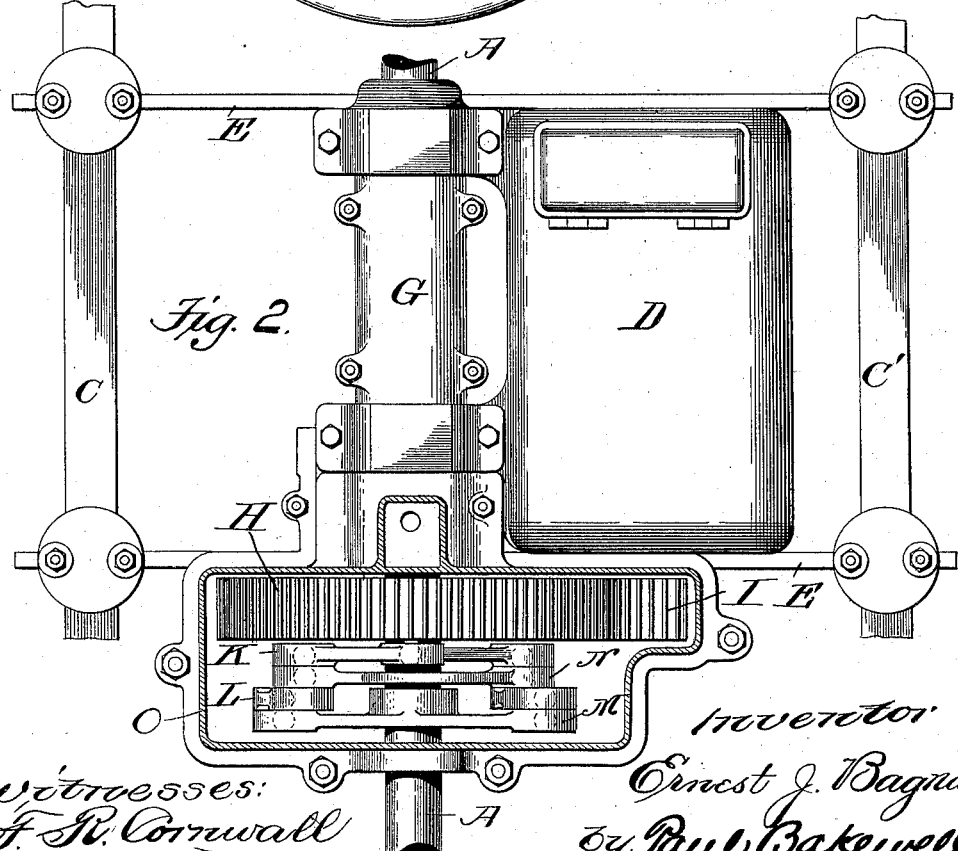
Figure 13:
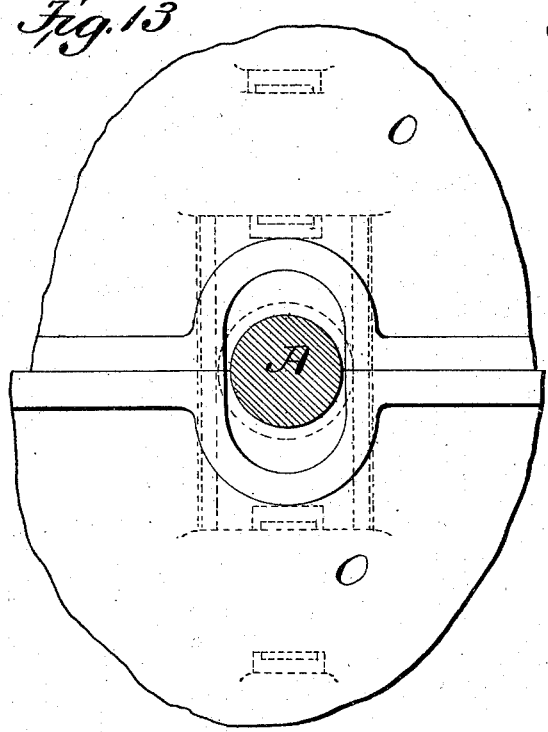
Figure 14:
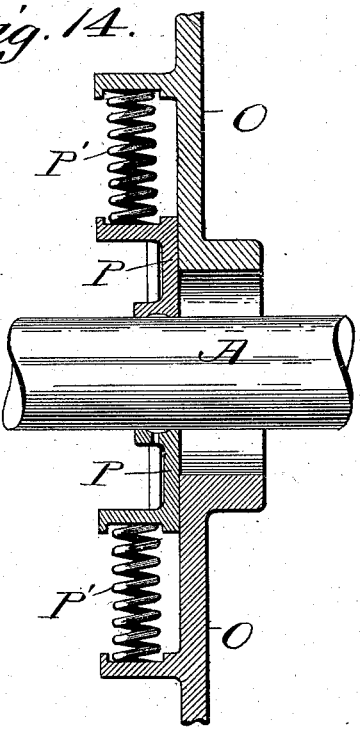
Figure 15:
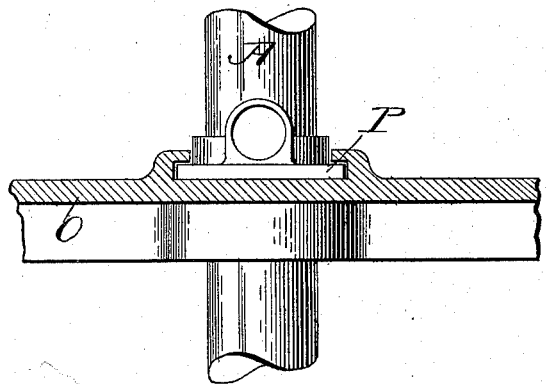
Figure 16:
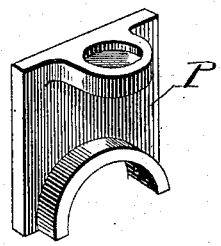

Figure 1 is a side elevational view, one side of the gear-casing being removed to more clearly show the interior mechanism thereof. Fig. 2 is a top plan view. Fig. 3 is a sectional view through the sleeve and its bearings, taken longitudinally to the axle. Fig. 4 is a cross-sectional view through the sleeve and its bearings. Fig. 5 is an end elevational view illustrating the axle-guide on the sleeve-bearing. Fig. 6 is an elevational view of the power-transmitting gear. Fig. 7 is a cross-sectional view through the sleeve. Fig. 8 is an elevational view of the gear-casing, showing the manner of permitting the axle to play therein. Fig. 9 is an enlarged view of one of the driving-pins of the power-transmitting gear. Fig. 10 is a slight modification of the equalizing-bar. Fig. 11 is a side elevational view of the axle-driving gear, showing a slightly modified form of link; and Fig. 12 is an end elevational view of the same. Fig. 13 is a side elevational view of part of the gear-casing, showing the manner of excluding dirt and dust therefrom, at the same time permitting the axle to play vertically therein. Fig. 14 is a vertical sectional view through the same. Fig. 15 is a top plan view of the same. Fig. 16 is detail view of one of the plates.

This invention relates to a new and useful improvement in motor mountings and driving mechanism, the object being to produce a simple and efficient means for flexibly suspending the motor from a car-truck, in which the motor is capable of having a free vibratory movement independent of the truck, at the same time remaining in proper relation to the truck and the driven axle.

With this object in view the invention consists, generally stated, in mounting the driving and transmitting gear on the motor, or a part thereof, so that said driving-gear will move with the motor, and in driving the axle from this "floating" power through a flexible equalizing driving-gear. Incidental to this other features of invention consist in pivotally mounting the motor on a sleeve, upon which sleeve the transmitting-gear is also mounted, such parts being so constructed as to be readily removed without disturbing the car-wheels, and in suspending the motor entirely on springs and providing means to permit vertical play, prevent longitudinal lunging and lateral oscillation.

Other details of invention reside in the construction, arrangement, and combination of the several parts, all as will hereinafter be described, and afterward pointed out in the claims.

In the drawings, A indicates the axle, and B the truck-wheel.

C and C' indicate the "end" and "center" bars of the truck, respectively, as they are called, and D indicates the motor, such parts being of any ordinary or approved construction.

The motor is supported by bars E, which are yieldingly mounted, preferably at their ends, through the medium of springs E', said bars being supported from the springs by hangers, as shown. Springs E' have bearings upon the end and center bars of the truck, and in this manner the entire weight of the motor is yieldingly supported.

To prevent the bars E from hammering on the under side of the truck-bars, I interpose between said parts buffer-springs F, as shown. In order to adjust the vertical position of the motor, the nuts on the threaded ends of the hangers are rotated, which elevates or lowers the motor relative to the truck-frame and axle.

Extending from the side of the motor are half bearings or boxes $d$, in which is received a sleeve or quill G, which extends laterally some distance on one side and has keyed to it a transmitting-gear H. The axle is permitted to rotate freely in this sleeve, there being no connection between the two, and to obviate the removal of the car-wheels for the purpose of removing or inserting the sleeve in its position I divide said sleeve (see Fig. 7) and bolt the two halves together.

The upper halves of the motor-bearing boxes for sleeves G are preferably formed with oil-wells for a suitable lubricant, and one of these boxes, i. e., that one at the extreme end of the motor-casing, is formed with lugs or ears (see Fig. 5) which extend on each side of the axle and tend to prevent the motor from lunging backward or forward when the car is starting or stopping, but permitting the motor to have a vertical movement. These lugs or ears may either be formed on the motor half of the bearing or on the removable cap, as shown.

The "transmitting-gear" H, as I have termed it, is meshed with the driving-pinion I on the armature-shaft of the motor, (see Figs. 1 and 2,) and is driven thereby. As the sleeve upon which gear H is mounted is journaled in a fixed position relative to the motor-casing, it will be seen that it and the driving-pinion I are constantly in alinement and occupy proper relations to each other. This gear H is also by preference divided, the two halves being secured together by bolts, which enables the gear to be clamped upon the sleeve and also clamp the sleeve.

J indicates driving-pins arranged on gear H, the ends of which pins are preferably formed convexed (see Fig. 9) to afford slight lateral play at the joints of the driving-links K which are mounted thereon. Connected to the opposite ends of the driving-links are driven links L, the opposite ends of which latter are connected to an arm M fixedly mounted on the axle. Extending between the connections of the driving-links to the driven links is an equalizing-arm N, which is preferably bifurcated at its middle or formed in two parts with a central space, as shown in Figs. 10 and 11, to receive and straddle the axle A. The pivot-pins of these links are all preferably formed with convexed faces to permit lateral play of the parts, said pins being seated in concaved bearings formed in the links. To insure retention of the links on the pins, the links are divided at their bearings, as shown in Fig. 11, and clasp the pins. Of course the edges of the links around the pin-opening are slightly cut away to permit lateral play without binding of the parts.

The operation of this driving mechanism is as follows: Power being imparted to gear H by pinion I, will rotate said gear, and also sleeve G, which, as will be seen, having quite an extended bearing, is practically relieved of all torque. The rotation of gear H revolves the driving-pins, which carry with them the driving-links K. Assuming the gear to be rotating to the right, these links will pull the driven links after them and tend to straighten the line of pull according to the positions of the pivotal points of connection between the driven links L and arm M, which is fixed on the axle. This straightening tendency between the links is resisted by the equalizing-bar, (which is in this instance subjected to a compressional strain,) and the result is that the axle is driven by practically a positive connection, i. e., positive in the sense that the power is imparted without lost play, and one which will permit the motor and its associate parts to freely "float" without endangering the effectiveness of the driving mechanism. In fact, although the motor is free to float, still the axle-driving mechanism, due to the presence of the equalizing-bar, will always have a tendency to center the axle and prevent wabbling of the motor. It will further be noticed that absolute parallelism of movement is obtained, and that the axle A is driven from two points, the strain on the driving-power being likewise distributed. Should the gear H rotate to the left, it will push the driving-links instead of pulling them around and the equalizing-bar will be subjected to a tensile strain. Otherwise the action is the same, no matter in which direction the parts be rotating.

The moving parts of my improved driving mechanism are incased in a shell or casing O, which is secured to the motor-casing, and which is provided on its inner side with an extended bearing-box, through which the sleeve G passes. (See Fig. 3.) This casing is divided horizontally, enabling the lower half to be used as a trough for a lubricant, if desired. The axle A passes through a vertically-elongated opening formed by registering recesses in the two parts, as shown in Fig. 8, which permits vertical movement of the casing, but prevents a forward or backward movement. This vertically-elongated opening in the casing corresponds in function to the lugs on the bearing-box on the opposite side of the motor.

To exclude dust from the casing, which would have access through the vertically-elongated opening, I mount, preferably on the inside of the casing, two spring-pressed plates P, which embrace the axle A, as shown in Figs. 13, 14, and 15. The semicircular recesses of these plates, which receive the axle, are preferably recessed in their bearing-surfaces to receive a lubricant. These plates are mounted in guides in the sections of the casing and have a movement in the direction of the long line of the axle-opening in the casing. The springs P', which are seated in lugs on the casing and plates, respectively, tend at all times to force the plates toward each other or to embrace the axle. If desired, these plates may also be placed on the exposed end of the sleeve G. This could be done with but little trouble, the only difference being that the plates which close the opening of sleeve G would be on the outside, while those which close the opening of the casing can be placed on the inside, as shown.

I am aware that many minor changes in the construction, arrangement, and combination of the several parts of my device may be made and substituted for those herein shown and described without in the least departing from the nature and principle of my invention.

Having thus described my invention, what I claim, and desire to secure by Letters Patent, is—

1. The combination with the truck-frame and car-axle, of a motor which is yieldingly supported from said truck-frame by suitable bars, a sleeve mounted in bearings projecting from one side of the motor, said sleeve encircling the axle, and a power connection between armature-shaft, sleeve, and axle, said connection between the sleeve and axle being flexible; substantially as described.

2. The combination with the truck-frame and axle, of a motor yieldingly supported from the truck-frame, a sleeve mounted in bearings projecting from the motor-frame, which sleeve encircles the axle, a gear-wheel mounted on the sleeve, which gear is driven by a pinion on the armature-shaft, a flexible connection between the sleeve-gear and axle which permits independent movement between the motor and axle, said gearing tending at all times to restore a normal relative position between the parts, and means for confining the movement of the sleeve relative to the axle, to a vertical movement; substantially as described.

3. The combination with a floating motor, of an axle adapted to be driven thereby, means for limiting the movement of the motor, at its points of engagement with the axle, to a vertical movement and an equalized driving mechanism between the motor and axle; substantially as described.

4. The combination with the truck-frame, and axle, of a motor having half-boxes arranged on one of its sides, caps for said boxes, a sleeve mounted in said boxes and surrounding the axle, a gear mounted on said sleeve which is driven by a pinion on the armature-shaft, a flexible connection between the sleeve-gear and axle, and means on said truck for preventing forward and backward movement of the motor relative to the axle; substantially as described.

5. The combination with the truck-frame and axle, of a motor having boxes arranged on one of its sides, a sleeve mounted in said boxes and surrounding the axle, a driven gear-wheel mounted on the sleeve, a rigid arm mounted on the axle, a connection between said sleeve-gear and arm comprising four links, arranged in pairs and pivoted together, and an equalizing-arm connecting the two pairs of links; substantially as described.

6. The combination with a motor, of an axle, a sleeve on the motor which surrounds the axle, permitting play between the parts, a master-gear mounted on the sleeve and which is driven by a pinion on the armature-shaft of the motor, driving-links pivoted on the master-gear, driven links pivoted on the driving-links, an equalizing-bar pivoted to the driving and driven links, and an axle-bar to which said driven links are pivoted, the pivot-pins all of said links and bars being formed with convexed faces to permit lateral play; substantially as described.

7. The combination with an axle to be driven, of an axle-bar rigidly secured thereto, a floating driving-power which is adapted to revolve concentric with said axle, pairs of links pivoted together and having their outer extremities pivoted to the revolving driving-power and the ends of the axle-bar respectively, and an equalizing-bar which is pivoted to the pivotal connection between the inner ends of the respective pairs of links; substantially as described.

8. The combination with a motor, of an axle, a master-gear which is driven by the motor, driving-pins on the master-gear which are formed with convexed bearing-faces, driving-links mounted on the convexed faces of said pins, driven links connected to the driving-links, an axle-bar to which the driven links are connected, an equalizing-bar connected to, and extending between, the pivotal points of connection between the driving and driven links, and pivot-pins to which said parts are pivoted, said pins being formed with convexed bearing-faces to permit slight lateral play; substantially as described.

9. The combination with a floating motor, of an axle, a driving mechanism between the motor and axle, and a gear-casing for said driving mechanism, which casing is provided with a vertically-elongated slot to permit vertical play of the axle therein; substantially as described.

10. The combination with a floating motor, of an axle, a driving mechanism between the motor and axle, a gear-casing for said driving mechanism, which casing is provided with a vertically-elongated slot to permit vertical play of the axle therein, and spring-pressed plates which are mounted in guideways in the gear-casing above and below the axle, for closing said opening; substantially as described.

11. The combination with the axle, of a motor, bearings in the motor-casing, a sleeve mounted in said bearings and surrounding the axle, driving mechanism between the motor, sleeve, and axle, means on said sleeve-bearings for limiting the movement of the motor to a vertical movement, a gear-casing for said driving mechanism, said gear-casing being secured to the motor-casing and having a vertically-elongated slot for the passage of the axle and to permit vertical play, and yielding plates which bear against the axle and close the opening in the gear-casing; substantially as described.

In testimony whereof I hereunto affix my signature, in presence of two witnesses, this 30th day of August, 1895.

ERNEST J. BAGNALL.

Witnesses:
P. G. KASSULKER,
K. A. GERHART.